(12) United States Patent
Ledenyov et al.

(10) Patent No.: US 12,417,216 B2
(45) Date of Patent: Sep. 16, 2025

(54) SYSTEMS AND METHODS FOR PERFORMING DATA MIGRATION BETWEEN DATA CENTERS

(71) Applicant: Acronis International GmbH, Schaffhausen (CH)

(72) Inventors: Dmitry Ledenyov, Sofia (BG); Alexander Andreev, Sofia (BG); Maxim Cherey, Chandler, AZ (US); Brad Smith, Mesa, AZ (US); Serg Bell, Singapore (SG); Stanislav Protasov, Singapore (SG)

(73) Assignee: Acronis International GmbH, Schaffhausen (CH)

( * ) Notice: Subject to any disclaimer, the term of this patent is extended or adjusted under 35 U.S.C. 154(b) by 0 days.

(21) Appl. No.: 18/889,462

(22) Filed: Sep. 19, 2024

(65) Prior Publication Data

US 2025/0110931 A1    Apr. 3, 2025

Related U.S. Application Data

(60) Provisional application No. 63/541,913, filed on Oct. 2, 2023.

(51) Int. Cl.
*G06F 16/21* (2019.01)
*G06F 11/14* (2006.01)

(52) U.S. Cl.
CPC ........ *G06F 16/214* (2019.01); *G06F 11/1458* (2013.01); *G06F 2201/84* (2013.01)

(58) Field of Classification Search
None
See application file for complete search history.

(56) References Cited

U.S. PATENT DOCUMENTS

2010/0198730 A1 *   8/2010   Ahmed .................. G06F 21/30
                                                                              380/278

* cited by examiner

*Primary Examiner* — Eddy Cheung
(74) *Attorney, Agent, or Firm* — ArentFox Schiff LLP; Michael Fainberg

(57) ABSTRACT

In one aspect, a system may receive, via a user graphical user interface, a request to perform a data migration from a source data center to a destination data center. A system may in response to receiving the request, perform the data migration by: (1) creating a copy of a tenants structure that lists information about each tenant of the source data center, wherein a respective tenant is a representation of a user on a platform level, (2) creating and activating, on the destination data center, a plurality of new user accounts that match a main login body and suffix of a plurality of existing user accounts on the source data center, (3) re-registering, at the destination data center, agents from the source data center; and (4) migrating backup data from the source data center to the destination data center.

18 Claims, 9 Drawing Sheets

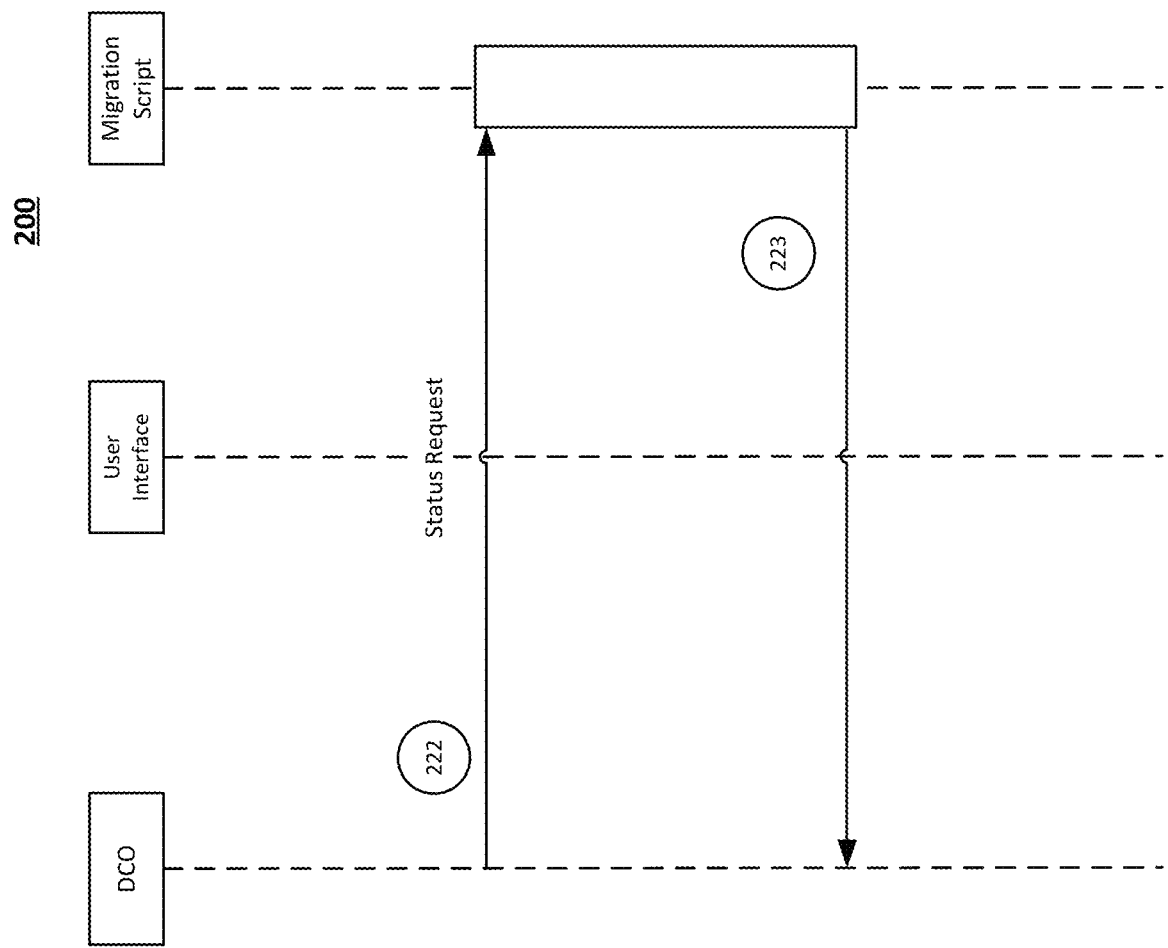

300

| Migration configurator |
|---|

Source DC:

| DC URL: | https://eu-cloud.acronis.com |
| Client ID: | 00000000-000000-0000-0000-000000 |
| Client Secret: | GdahfhdnlkaZfjvabkGakjyg2hcbiu1hj== |
| Tenant ID: | 00000000-000000-0000-0000-000000 |

Destination DC:

| DC URL: | https://eu2-cloud.acronis.com |
| Client ID: | 00000000-000000-0000-0000-000000 |
| Client Secret: | GdahfhdnlkaZfjvabkGakjyg2hcbiu1hj== |
| Tenant ID: | 00000000-000000-0000-0000-000000 |

[ Submit ]

FIG. 3

SYSTEMS AND METHODS FOR PERFORMING DATA MIGRATION BETWEEN DATA CENTERS

CROSS-REFERENCE TO RELATED APPLICATIONS

This application claims the benefit of U.S. Provisional Application No. 63/541,913, filed Oct. 2, 2023, which is herein incorporated by reference.

FIELD OF TECHNOLOGY

The present disclosure relates to the field of data migration, and, more specifically, to systems and methods for performing data migration between data centers.

BACKGROUND

Data migration is an important part of data storage and security. The transfer of data may be necessary for lawful reasons. For example, in many countries the law obliges certain organizations (e.g., government organizations) to keep their data within the country. If the data is originally in a data center outside of the country, it needs to be migrated to a local data center. The transfer of data may also be necessary for performance reasons. For example, the latency in downloading data from a data center may be decreased if the data center is closer to the device downloading the data. In order to improve download times, the data may be migrated to closer data centers.

However, data migration is a complex matter that can be hampered by low performance. For example, there may be various bottlenecks during migration that prevent fast, efficient, and secure transfer of data.

SUMMARY

In one exemplary aspect, the techniques described herein relate to a method for data migration, the method including: receiving, via a user graphical user interface, a request to perform a data migration from a source data center to a destination data center; and in response to receiving the request, performing the data migration by: creating a copy of a tenants structure that lists information about each tenant of the source data center, wherein a respective tenant is a representation of a user on a platform level; creating and activating, on the destination data center, a plurality of new user accounts that match a main login body and suffix of a plurality of existing user accounts on the source data center; re-registering, at the destination data center, agents from the source data center; and migrating backup data from the source data center to the destination data center.

In some aspects, the techniques described herein relate to a method, wherein creating the plurality of new user accounts further includes: in response to determining that two matching user accounts cannot exist on both the source data center and the destination data center, generating, on the destination data center, an intermediate login for each user account corresponding to the plurality of existing user accounts, wherein the intermediate login includes an original login concatenated with a predefined term; and in response to determining that the data migration is complete: deleting the plurality of existing user accounts on the source data center; and modifying, for the plurality of new user accounts, each intermediate login to match the original login without the predefined term.

In some aspects, the techniques described herein relate to a method, wherein each tenant in the tenants structure has different specifications including names, contacts, tenant types, quotas, available services, and available storage.

In some aspects, the techniques described herein relate to a method, wherein the graphical user interface outputs a list of data centers available to receive migration data and wherein receiving the request includes receiving a selection of the destination data center from the list of data centers.

In some aspects, the techniques described herein relate to a method, further including: transferring agent protection plans associated with the agents from the source data center to the destination data center.

In some aspects, the techniques described herein relate to a method, wherein creating the plurality of new user accounts further includes setting parameters for services, applications, and quotas in the plurality of new user accounts that match parameters for services, applications, and quotas in the plurality of existing user accounts.

It should be noted that the methods described above may be implemented in a system comprising at least one hardware processor and memory. Alternatively, the methods may be implemented using computer executable instructions of a non-transitory computer readable medium.

In some aspects, the techniques described herein relate to a system for data migration, the system including: At least one memory; and At least one hardware processor coupled with the at least one memory and configured, individually or in combination, to: receive, via a user graphical user interface, a request to perform a data migration from a source data center to a destination data center; and in response to receiving the request, perform the data migration by: creating a copy of a tenants structure that lists information about each tenant of the source data center, wherein a respective tenant is a representation of a user on a platform level; creating and activating, on the destination data center, a plurality of new user accounts that match a main login body and suffix of a plurality of existing user accounts on the source data center; re-registering, at the destination data center, agents from the source data center; and migrating backup data from the source data center to the destination data center.

In some aspects, the techniques described herein relate to a non-transitory computer readable medium storing thereon computer executable instructions for data migration, including instructions for: receiving, via a user graphical user interface, a request to perform a data migration from a source data center to a destination data center; and in response to receiving the request, performing the data migration by: creating a copy of a tenants structure that lists information about each tenant of the source data center, wherein a respective tenant is a representation of a user on a platform level; creating and activating, on the destination data center, a plurality of new user accounts that match a main login body and suffix of a plurality of existing user accounts on the source data center; re-registering, at the destination data center, agents from the source data center; and migrating backup data from the source data center to the destination data center.

The above simplified summary of example aspects serves to provide a basic understanding of the present disclosure. This summary is not an extensive overview of all contemplated aspects, and is intended to neither identify key or critical elements of all aspects nor delineate the scope of any or all aspects of the present disclosure. Its sole purpose is to present one or more aspects in a simplified form as a prelude to the more detailed description of the disclosure that follows. To the accomplishment of the foregoing, the one or more aspects of the present disclosure include the features described and exemplarily pointed out in the claims.

BRIEF DESCRIPTION OF THE DRAWINGS

The accompanying drawings, which are incorporated into and constitute a part of this specification, illustrate one or more example aspects of the present disclosure and, together with the detailed description, serve to explain their principles and implementations.

FIG. 2E is a flow diagram illustrating a fifth portion of the migration process.

FIG. 3 is a diagram illustrating a user interface for performing a migration from a source data center to a destination data center.

DETAILED DESCRIPTION

Figure 1:
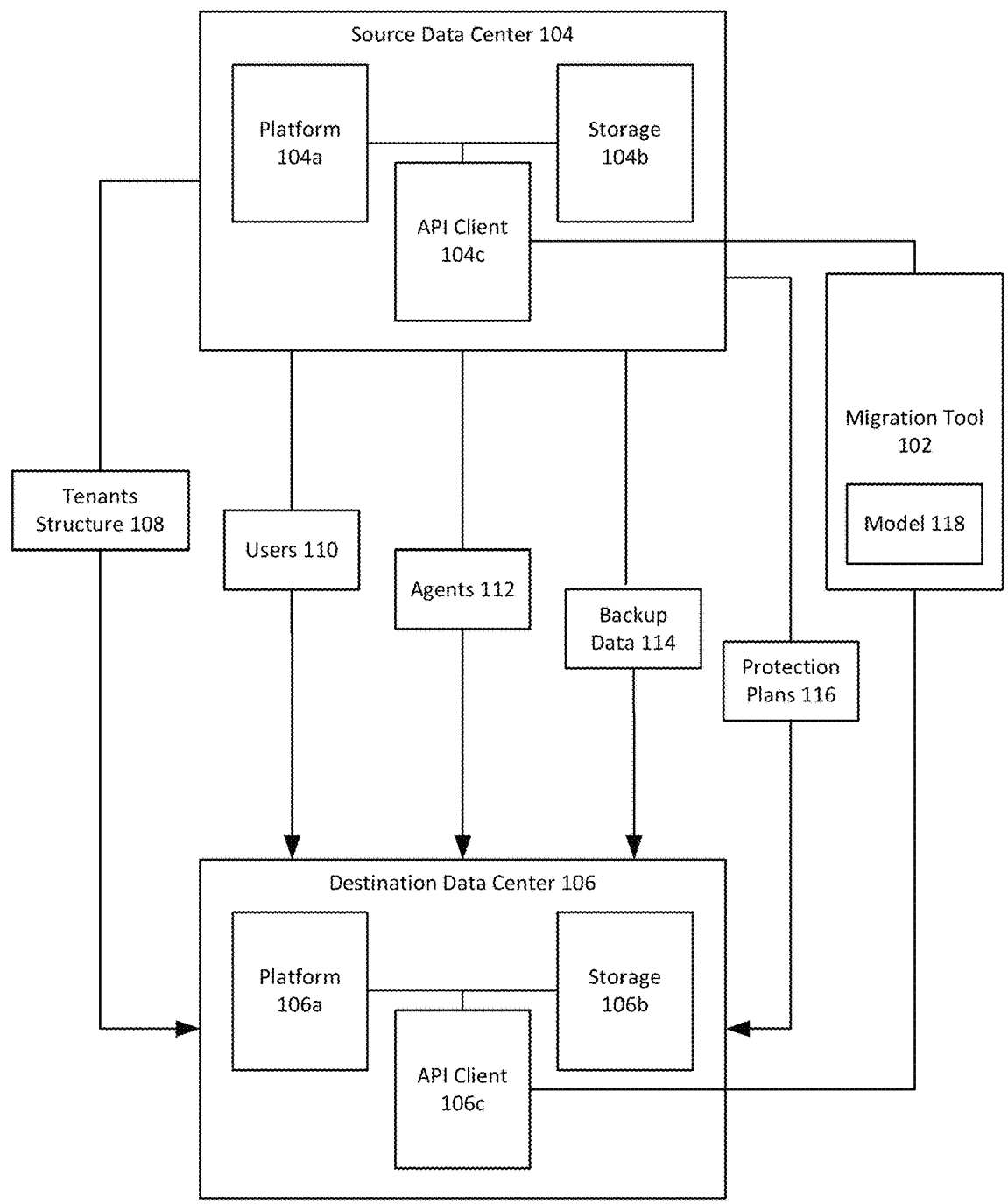
FIG. 1 is a block diagram illustrating a system for performing data migration between data centers.

Exemplary aspects are described herein in the context of a system, method, and computer program product for performing data migration between data centers. Those of ordinary skill in the art will realize that the following description is illustrative only and is not intended to be in any way limiting. Other aspects will readily suggest themselves to those skilled in the art having the benefit of this disclosure. Reference will now be made in detail to implementations of the example aspects as illustrated in the accompanying drawings. The same reference indicators will be used to the extent possible throughout the drawings and the following description to refer to the same or like items.

The present disclosure describes an efficient and secure migration process between two or more data centers using a cross-data center migration tool. The cross-data center migration tool is a novel solution designed to automate the migration of customer data and configurations between different data centers. The migration tool of the present disclosure addresses the challenges posed by legacy code and interdependencies in existing migration systems, providing a simplified and efficient approach to data center migration. By creating a copy of account structure on the destination data center, configuring proper login credentials, migrating, remapping customer data and configurations, the smooth finalization of the migration process migration tool ensures a seamless transfer of data. With automated processes and comprehensive use case coverage, the cross-data center migration tool offers significant advantages over traditional migration methods.

Through one integrated platform, service providers can deliver all of the cyber protection solutions that clients demand. In order to ensure compliance and to keep a local presence, the migration tool allows users to choose where to host their system(s) and store their data over data centers worldwide. During initial onboarding, the user is offered to choose a data center where their data will be migrated to.

It should be noted that each data center may have a different platform, which is a software solution that has a plurality of services providing customers with security and other features. It is possible that the storage may be physically residing in a different place than the platform. For example, the platform may be in a server in Frankfurt, Germany and the storage may be in a server residing in Paris, France. In some cases, the data center may also have multiple different storages connected at the same time.

There are various use cases of data migration. As mentioned previously, in many countries the law obliges certain organizations (e.g., government organizations) to keep their data within the country. Additionally, transfers of agent management and backup data shows better quality if the latency to the data center and storage is relatively low. Acronis™ is creating new small-scale data centers in different countries, which were previously unavailable for a great number of partners. As a result, several partners have chosen the closest data center to their location to move their data (e.g., moving clients from one data center out of the country to another data center nearest to them in the country). There are 3 sub-cases to consider. Each sub-case includes an ability to do the migration between one data center (e.g., Acronis-hosted data center, partner-hosted data center, etc.) to another data center (e.g., partner-hosted data center, Acronis-hosted data center, etc.).

In the first sub-case, all customers and partners are moved from one data center to another. In the second sub-case, a portion of customers and partners are moved from one data center to another. In the third sub-case, a portion of all customers and partners are moved from one data center to another and their structure is re-ordered in the destination.

In another use case, some Acronis partners have set up improper provisioning in their integrations. For example, instead of creating end user computing (EUC) with users for each client under a partner tenant, they create a backup user for each client under a EUC tenant. While provisioning itself may be easily fixed in integration, there is no conventional way to move users between EUCs, and thus it is unclear how to fix the users that are already deployed.

In another use case, some of existing Acronis consumer customers which are using products such as Acronis Cyber Protect 15 Cloud are large enough to become Acronis partners. In order to start as an Acronis partner or any existing Acronis managed service provider (MSP) end user customer, they have to re-protect their devices and start backing up from scratch. For the customers that are large enough, this case is usually not acceptable. Therefore, migration from their existing license model to the MSP-based is a good approach to save such customers and help MSPs to grow the annual recurring revenue.

In another use case, existing Acronis consumers using products such as Acronis Cyber Protect Cloud on-premise deployment (full Acronis data center deployment on top of customer owned infrastructure and environment of choice) decide to migrate their management to an Acronis hosted data center, to reduce their operational costs.

In another use case, some of the large Acronis Cyber Protect Cloud data centers such as US5, US2, EU1, EU2, CA01 may require migration of part of their installed base to a new location for offloading or connectivity quality improvement. This will require both management and data layer migration to a new/alternative data center.

FIG. 1 is a block diagram illustrating a system 100 for performing data migration between data centers.

System 100 includes migration tool 102, which is configured to perform a data migration from source data center 104 to destination data center 106. Migration tool 102 may be a software installed on source data center 104 and destination data center 106. For example, there may be a client of migration tool 102 installed on both centers that are capable of performing a plurality of tasks. As shown in FIG. 1, API client 104c is installed on source data center 104 and API client 106c is installed on destination data center 106. In some aspects, migration tool 102 may be installed on a computing device of a user. For example, the computing device may be a personal computer, a server, a virtual machine, a mobile device, a virtual container, a virtual host, etc., from which the user can initiate the migration (e.g., by specifying source data center 104 and destination data center 106). Each data center includes a storage portion (e.g., storage 104b in source data center 104 and storage 106b in destination data center).

When a migration is requested, migration tool 102 first creates a full copy of a tenants structure 108 originating from source data center 104 on destination data center 106.

A tenant is a representation of a user or a customer on the platform level. For example, source data center 104 has platform 104a and destination data center 106 has platform 106a. Each tenant has different specifications such as a name, contacts, tenant type, quota, available services and storage. A tenant may belong to a partner, a customer, or a user entity. If it is a partner entity, migration tool 102 may create and manage billing of customers, restrict their quotas, assign some billing services to manage their usage. If the tenant belongs to a customer, migration tool 102 may create users, change quotas, see reports about the protected resources. If the tenant belongs to a user, migration tool 102 may manage agents, protection plans, backup data, and other platform services available for a particular customer and partner where a user is residing. The system has a particular hierarchy where the lowest entity is the end user. In order to start using the service, the user registers his agent using the user's login credentials (e.g., username and password).

Subsequent to creating tenants structure 108 on destination data center 106, migration tool 102 creates new users 110 with the same main login body+suffix from source data center 104. Because all logins across the world for all data centers are unique, it is not possible to have the same login existing on two different data centers at the same time. As a result, migration tool 102 may generate an intermediate login for each user account during migration. Once the migration is completed, migration tool 102 may delete the old login and change the intermediate login back to the original login name (e.g., by removing a suffix). For example, an intermediate login may be "original_login+migration." After creating the tenants structure 108 and users 110 on destination data center 106, migration tool 102 may read the current enabled services, applications, and quotes for the entire hierarchy of tenants and users, may map the source tenant\user and destination tenant\user, and may set the same parameters to the created destination tenants\users.

Migration tool 102 may configure each created user in destination data center 106 with a specified login and password, a specified role (e.g., administrator, read-only user, reports only, etc.), and specified two-factor authentication.

Once the users are automatically created, configured, and activated, migration tool initiates re-registering of agents 112 from the source users to the destination users according to the mapping which was created during the users copy. At the same time, depending on the partner's storage type (e.g., Acronis-hosted/Partner-hosted) migration tool 102 initiates migration of backup data 114 according to the end user customers' or users' identifications (ID) mapping executed during the tenants\users creation. Once all agents are re-registered, migration tool 102 will then migrate agent protection plans 116.

Migration tool 102 is developed to address the challenges encountered when migrating customer data and configurations between different data centers. The existing implementation of migration tools contain legacy code and have high interdependencies between components, making it difficult to provide a simple and efficient migration tool for customers.

Data center migration is a complex process that involves moving customer data, configurations, and settings which are interdependent on each other's IDs from one data center to another. It is often necessary due to various reasons, such as the establishment of new data centers in different geographical locations, the need for improved connectivity or compliance with local data storage regulations. However, performing migrations manually is time-consuming, prone to errors, and can cause disruptions to the current or other customer's services.

Existing migration methods require extensive manual effort and lack a standardized approach. Customers and partners face difficulties when migrating their data and configurations between data centers, as the process involved complex interactions between different components and dependencies. This complexity leads to inefficiencies, errors, and delays in the migration process, causing frustration for both service providers and their customers.

Migration tool 102 automates the migration process, eliminates manual tasks, and reduces the risk of errors. By providing a standardized and streamlined approach to data center migration, migration tool 102 simplifies the process and enhances the overall experience for customers and partners.

Migration tool 102 takes into account the specific requirements of migrating customer data, configurations, and settings. It considers factors such as proper mapping between the account structures, login credentials, user roles, two-factor authentication, agents, protection policies, credentials, and customer data. Migration tool 102 ensures that the migrated accounts in the destination data center are replicated with the same configurations and relations as the original accounts in the source data center—enabling a seamless transition for customers.

By automating the migration process, migration tool 102 reduces the complexity, time, and effort required to perform data center migrations. It provides a standardized and efficient approach, offering significant advantages over manual migration methods. The invention aimed to streamline data center migration, minimize disruptions to customer services, and enhance the overall migration experience for customers and partners.

An objective of the invention is to provide a standardized and automated method for migrating customer data and configurations between data centers. Migration tool 102 comprises several key components and functionalities that work together to facilitate the migration process.

Account Replication: Migration tool 102 creates a complete duplicate of the customer account structure on the destination data center's platform. This includes the creation of new accounts with modified login credentials to prevent conflicts with existing accounts. An intermediate login, such as "original_login+migration" is assigned to each account during the migration process until the migration is completed.

Configuration and Activation: Once the account structure is replicated, migration tool 102 configures the login credentials, roles, and two-factor authentication settings for each replicated account on the destination. This ensures that the migrated accounts have the same access and security measures as the original accounts. Migration tool 102 also activates the migrated accounts, allowing customers to access their data and configurations seamlessly.

Data Migration: Migration tool 102 facilitates the migration or remapping of customer data, including backups, configurations, and settings, to the appropriate locations in the destination data center. It ensures the integrity and continuity of customer data by accurately transferring the data from the source data center to the destination data center. This process minimizes data loss and ensures a seamless transition for customers.

Configuration Migration: In addition to data migration, migration tool 102 maps and sets the same parameters for services, applications, and quotas in the destination accounts. This ensures that the migrated accounts maintain the same service configurations as the original accounts, preserving the customer's settings and preferences. It helps avoid disruptions to the customer's services during the migration process.

Rollback: In case of the critical errors or just the customer changed the decision, there is an option to execute a Rollback of the whole migration procedure.

Migration tool 102 is designed to handle various use cases and scenarios. It supports migrations between Acronis-hosted data centers, partner-hosted data centers, and migrations from partner-hosted to Acronis-hosted data centers. It also caters to migrations involving restructuring of customer hierarchies on the destination data center. Migration tool 102 offers flexibility and customization to meet the specific requirements of each migration scenario.

Migration tool 102's user interface provides an intuitive and user-friendly experience for configuring migration settings, monitoring the migration progress, and managing any potential issues that may arise during the migration process. It offers real-time visibility into the migration status, ensuring transparency and facilitating effective communication between the service provider and the customer.

Comprehensive Migration: Migration tool 102 addresses both data migration and configuration migration. It ensures the accurate transfer of customer data, including agents, protection policies, credentials, backups, configurations, and settings, from the source data center to the destination data center. The migration of service configurations, applications, and quotas further enhances migration tool 102's effectiveness and comprehensive approach.

Flexibility and Customization: Migration tool 102 caters to various use cases and scenarios, allowing for migrations between different types of data centers (Acronis-hosted and partner-hosted), restructuring of customer hierarchies, and migrations from improper provisioning to the recommended hierarchy structure. This flexibility and customization demonstrate the inventive step, as migration tool 102 adapts to specific customer requirements.

Migration tool 102 offers an automated approach, account replication, comprehensive migration capabilities, ability to roll back the entire migration at any step and flexibility to handle various migration scenarios. By introducing these novel features, migration tool 102 significantly improves the efficiency, accuracy, and user experience of data center migrations, setting it apart from traditional manual migration methods.

Technical Effect: The technical effect of migration tool 102 for Automated Customer Data and Configuration Migration is the automation and streamlining of the data center migration process. This tool introduces several technical advancements that enhance the efficiency, accuracy, and effectiveness of migrating customer data and configurations between different data centers.

The technical effect can be summarized as follows:

Automation: Migration tool 102 automates various aspects of the migration process, reducing the need for manual intervention and minimizing human error. It automates tasks such as account replication, configuration migration, and data transfer, significantly streamlining the migration process and improving overall efficiency.

Standardization: Migration tool 102 provides a standardized approach to data center migration, ensuring consistency and reducing the risk of errors. It enforces a uniform structure for account replication, mapping configurations, and transferring data, eliminating inconsistencies that can arise from manual migrations.

Data Integrity: Migration tool 102 ensures the integrity of customer data during the migration process. It accurately transfers agents, protection policies, credentials, backups, configurations, and settings from the source data center to the destination data center, minimizing the risk of data loss or corruption. Migration tool 102's automated approach reduces the likelihood of human error, further safeguarding data integrity.

Seamless Transition: By automating account replication and configuration migration, migration tool 102 facilitates a seamless transition for customers. It creates duplicate accounts on the destination data center's platform, ensuring a consistent user experience and minimizing disruptions to services. The use of intermediate logins during the migration process allows for uninterrupted user access.

Efficiency and Time Savings: The automation and standardization provided by migration tool 102 significantly reduce the time and effort required for data center migrations. It eliminates manual tasks, accelerates the migration process, and minimizes the potential for errors, resulting in time savings for service providers and customers.

Flexibility and Customization: Migration tool 102 offers flexibility and customization options to handle different migration scenarios. It supports migrations between Acronis-hosted and partner-hosted data centers, allows for restructuring of customer hierarchies, and accommodates migrations from improper provisioning to the recommended hierarchy structure. This flexibility enhances migration tool 102's applicability to diverse customer needs.

In summary, the technical effect of migration tool 102 is the automation, standardization, and improvement of efficiency in migrating customer data and configurations between data centers. It ensures data integrity, facilitates a seamless transition, and offers flexibility for different migration scenarios. These technical advancements result in time savings, accuracy, and an enhanced migration experience for both service providers and customers.

Industrial Applicability: Migration tool 102 for Automated Customer Data and Configuration Migration has wide-ranging industrial applicability in the field of data center management and migration. It is a valuable solution for service providers, data centers, and organizations that handle large volumes of customer data and need to migrate it between different data centers efficiently and accurately.

Migration tool 102 finds applicability in various industries and sectors, including:

Cloud Service Providers: Migration tool 102 is highly relevant for cloud service providers who manage and host customer data across multiple data centers. It allows them to seamlessly migrate customer data and configurations between data centers, ensuring continuity of services and minimizing disruptions for their customers.

Managed Service Providers: Managed service providers (MSPs) can utilize migration tool 102 to efficiently migrate their clients' data and configurations from one data center to another. This is particularly beneficial for MSPs that offer cloud-based services and need to relocate customer data to optimize performance or comply with data sovereignty regulations.

Enterprise Organizations: Large enterprises that manage their own data centers can leverage migration tool 102 to streamline the migration of their internal data and configurations. Whether it's consolidating data centers, improving performance, or complying with regulatory requirements, migration tool 102 provides an automated and efficient solution for migrating critical business data.

Data Center Operators: Data center operators that manage multiple data centers can benefit from migration tool 102's automation capabilities to facilitate seamless migration for their customers. It simplifies the process of migrating customer data and configurations, enabling data center operators to offer enhanced services and improve customer satisfaction.

IT Service Providers: IT service providers that offer data center management and migration services can utilize migration tool 102 to improve the efficiency and accuracy of their migration processes. It enables them to provide seamless and reliable data center migration services to their clients, strengthening their portfolio and competitive advantage.

The industrial applicability of migration tool 102 is not limited to a specific sector or industry. It caters to a wide range of organizations that manage and migrate customer data between data centers. Migration tool 102's automation, standardization, and efficiency benefits make it a valuable asset for any entity involved in data center management and migration.

In some aspects, migration tool 102 involves the following processes:

Pre-migration reporting: This process does a snapshot of all possible customer's configurations, settings, hierarchy, usage, billing, audit, logs, resources, agents, protection policies, credentials, storages and quotas. Providing the historical timestamp and full description of all the resources which are about to be migrated.

Tenants Replication Process: This process includes creating a copy of the tenants and its user accounts on the destination data center's platform, modifying login credentials on the destination, and ensuring a consistent account structure. It maps account configurations and settings from the source to the destination data center.

Configuration Migration Process: This process involves migrating or remapping customer configurations, such as services, applications, and quotas, from the source to the destination data center. It ensures consistency and continuity of customer configurations.

Data Migration Process: This process focuses on transferring customer data, including agents, protection policies, credentials, backups, configurations, and settings, from the source data center to the destination data center. It maintains data integrity and ensures a smooth transition of data.

Post-migration Process: This process does a snapshot of all possible customer's configurations, settings, hierarchy, usage, billing, audit, logs, resources, agents, protection policies, credentials, storages and quotas on the destination. Comparing this data with the pre-migration report and providing the explicit description of the resources which were successfully migrated.

Technical Specifications and Requirements: To successfully deploy and operate the Cross-Data Center Migration Tool, the following technical specifications and requirements should be considered:

Software Platform: Migration tool 102 may be implemented as a software application or platform that can run on the source and destination data centers using Acronis Cyber Protect Cloud software. It should be compatible with the existing infrastructure and systems in both data centers.

Communication Channels: Migration tool 102 requires reliable communication channels between the source and destination data centers for data transfer and synchronization. These channels should have sufficient bandwidth and low latency to facilitate efficient migration.

Data Center Infrastructure: The source and destination data centers should have the necessary infrastructure, including storage systems, networking capabilities, and computing resources, to support the migration process.

Security Measures: Migration tool 102 should incorporate appropriate security measures to protect customer data during the migration process. This may include encryption protocols, access controls, and compliance with relevant data protection regulations.

Scalability: Migration tool 102 should be designed to handle migrations of varying scales, accommodating a large number of customer accounts, configurations, and data sets. It should be capable of efficiently scaling up or down based on the migration requirements.

By disclosing the functionalities, components, processes, and technical specifications of the Cross-Data Center Migration Tool, the patent application provides sufficient information to enable a person skilled in the relevant field to implement and use migration tool 102 without undue experimentation. It outlines the necessary steps and considerations for successful deployment and operation, ensuring that migration tool 102 can be effectively utilized in real-world scenarios.

Figure 2A:
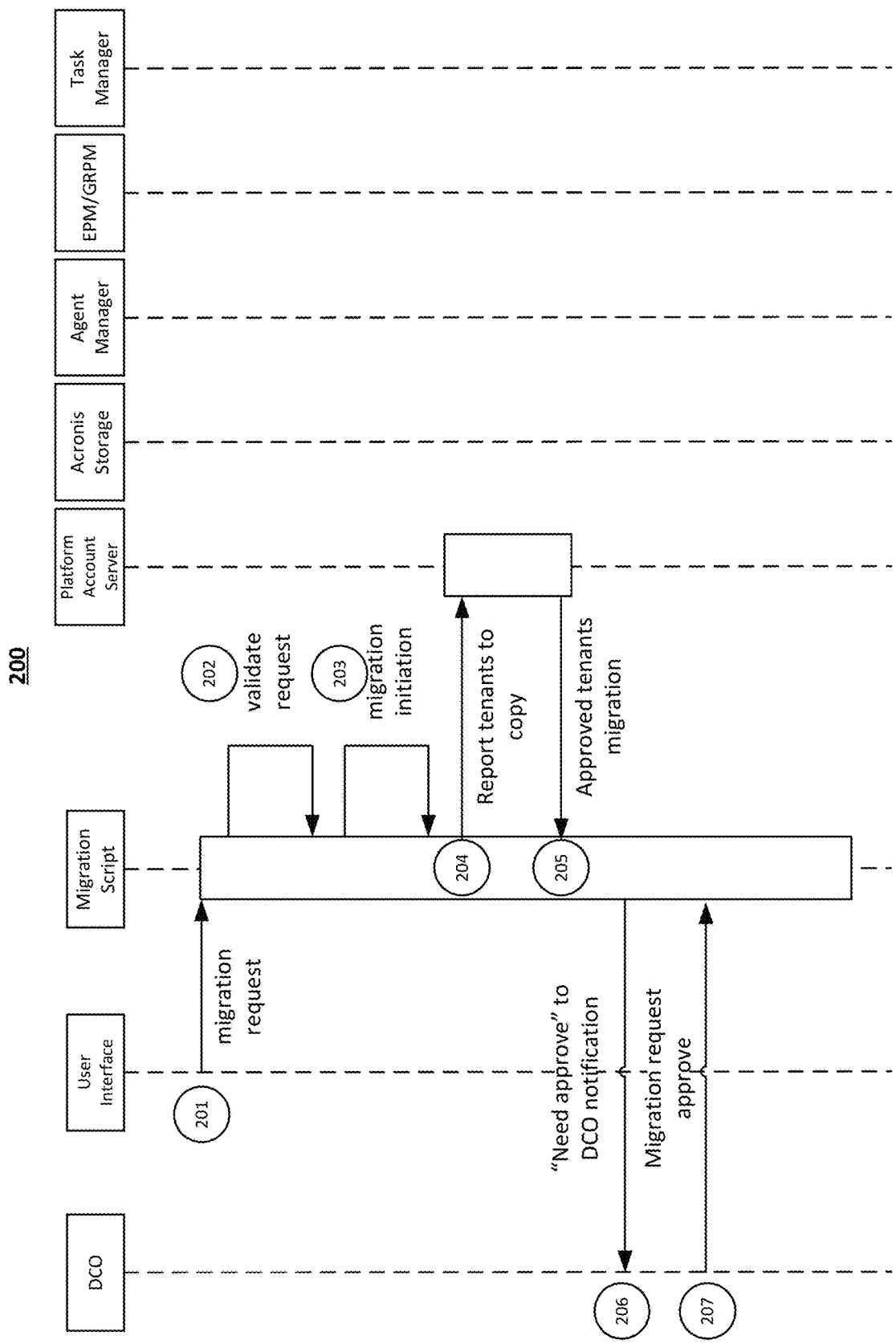
FIG. 2A is a flow diagram illustrating a first portion of the migration process.

FIG. 2A is a flow diagram illustrating a first portion of the migration process 200. At 201, a migration request is sent to migration script of migration tool 102. The migration request may be generated using a user interface (e.g., user interface 300 in FIG. 3). At 202, the migration script validates the request and at 203, the migration script initiates the migration.

At 204, the migration script reports the tenants to copy to a platform account server (e.g., of platform 104*a*). At 205, the platform account server approves the migration of the reported tenants. At 206, the migration tool requests approval to migrate to a data center outsourcer (DCO). At 207, the request to migrate is approved.

Figure 2B:
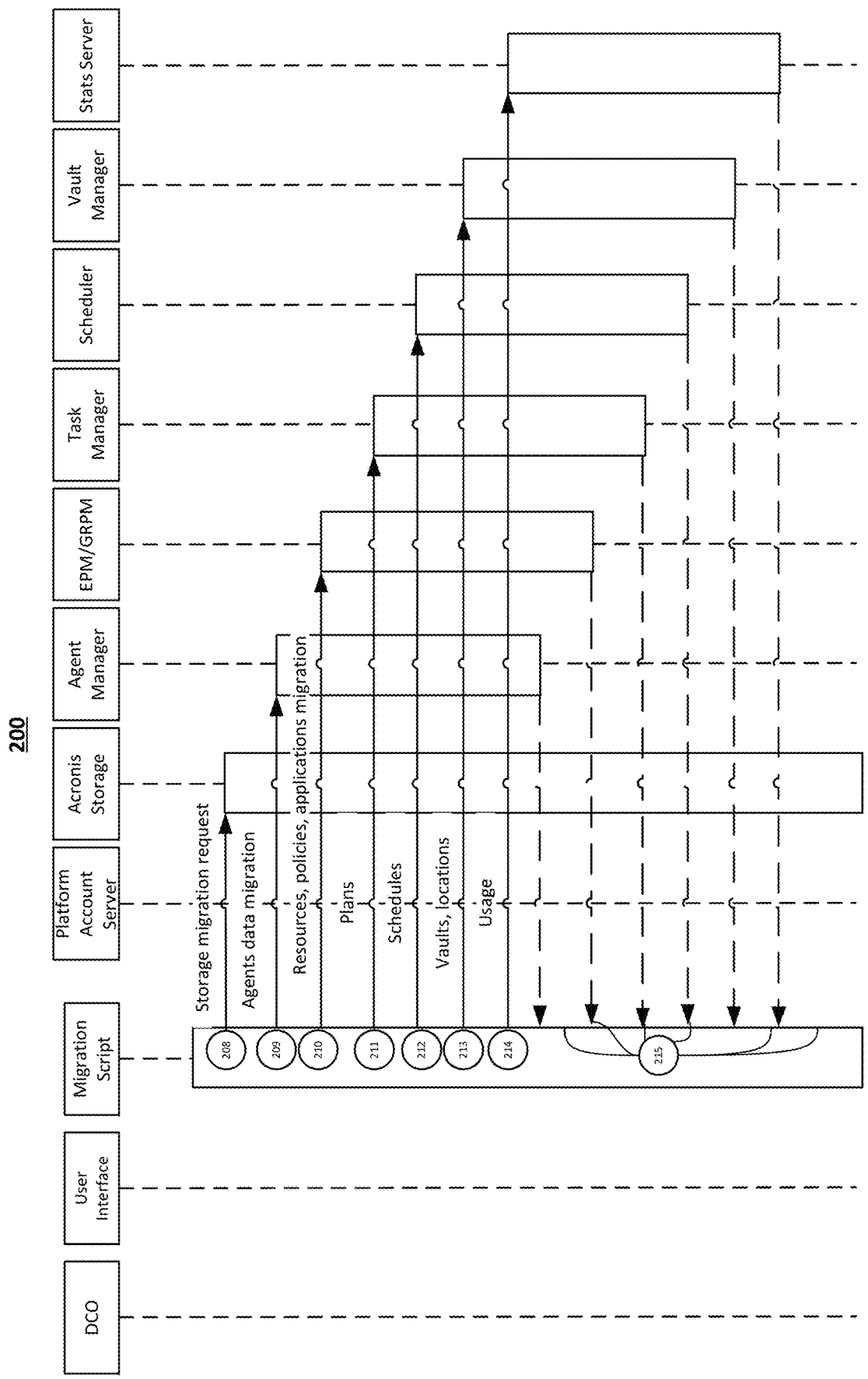
FIG. 2B is a flow diagram illustrating a second portion of the migration process.

FIG. 2B is a flow diagram illustrating a second portion of the migration process 200. At 208, the migration script sends a storage migration request to the storage facilities of the destination data center (e.g., Acronis storage). The storage facilities may be, for example, storage 106*b* in FIG. 1. At 209, the migration script transfers agents data to an agent manager part of platform 106*a*. At 210, the migration script transfers resources, policies, applications data for migration to EPM/GRPM of platform 106*a*. At 211, the migration script transfers plans to a task manager of platform 106*a*. At 212, the migration script transfers schedules to a scheduler of platform 106a. At 213, the migration script transfers vaults and locations to a vault manager of platform 106a. At 214, the migration script transfers usage data to a stats server of platform 106a. At 215, the migration script receives confirmation that the transferred information has been received.

Figure 2C:
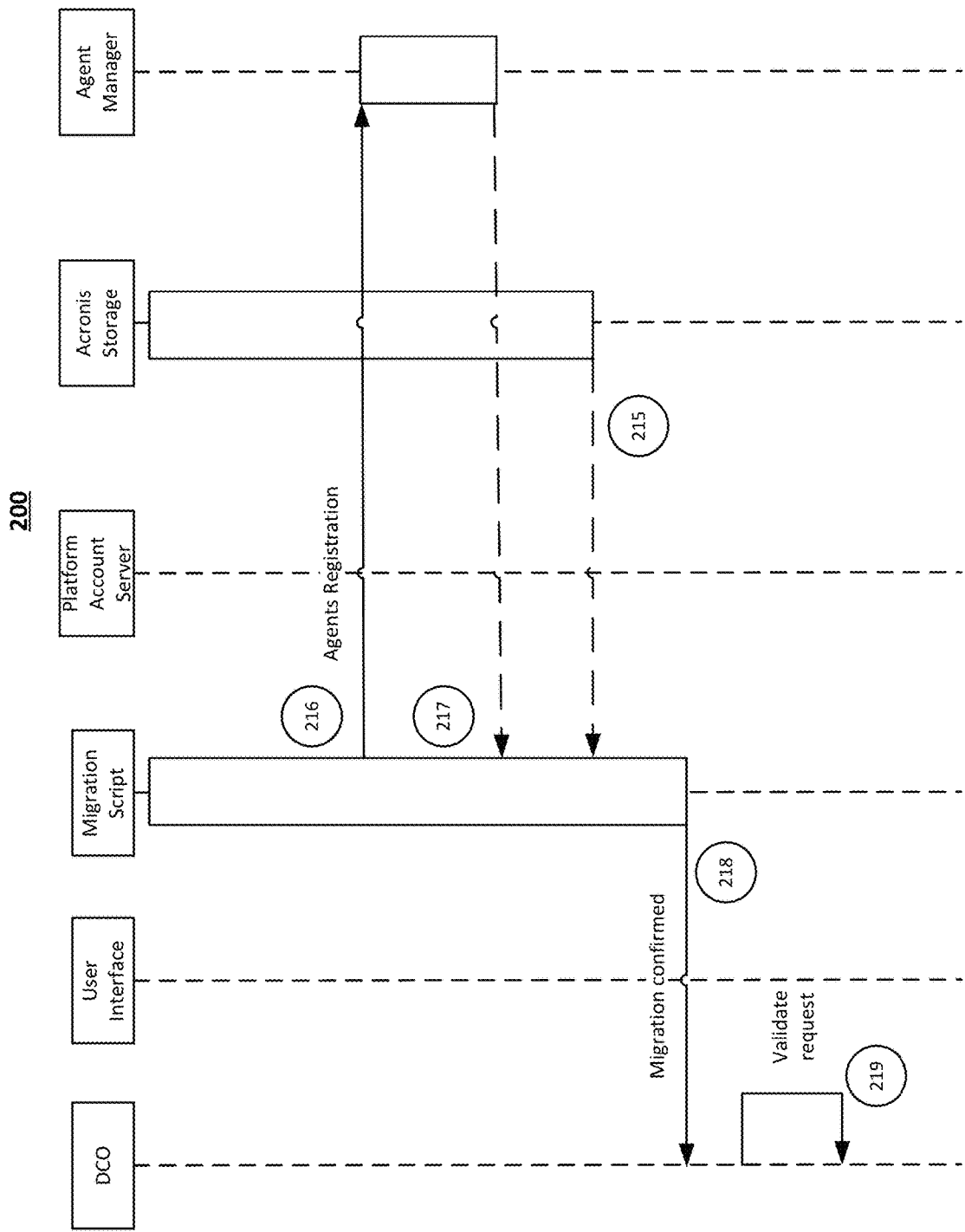
FIG. 2C is a flow diagram illustrating a third portion of the migration process.

FIG. 2C is a flow diagram illustrating a third portion of the migration process 200. At 216, the migration script transfers agents registration information to the agent manager of platform 106a. At 217, the migration script receives a confirmation of receipt. At 218, the migration script informs DCO that the migration is confirmed. At 219, DCO validates the request.

Figure 2D:
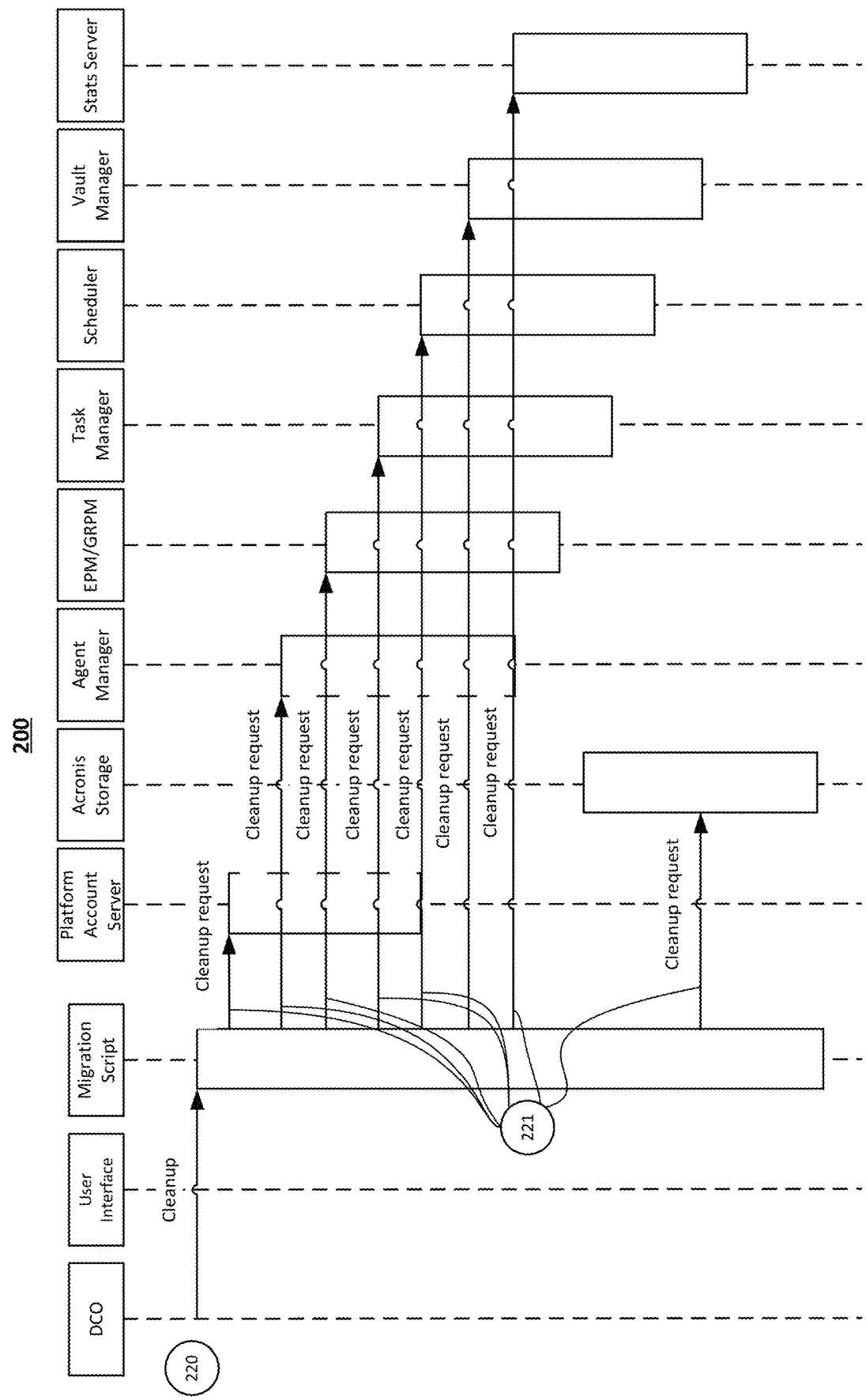
FIG. 2D is a flow diagram illustrating a fourth portion of the migration process.

FIG. 2D is a flow diagram illustrating a fourth portion of the migration process 200. At 220, the migration script receives a clean up request to clear the data from the source data center. At 221, the migration script transmits clean up requests to the platform account server, storage facilities, agent manager, EPM/GRPM, task manager, scheduler, vault manager, and stats server of the source data center.

FIG. 2E is a flow diagram illustrating a fifth portion of the migration process 200. At 222, the migration script receives a status request for the clean up from DCO. At 223, the migration script responds to the DCO (e.g., successful migration and clean up).

FIG. 3 is a diagram illustrating a user interface 300 for performing a migration from a source data center to a destination data center. As shown in user interface 300, a user may initiate a data migration by indicating a data center URL, client ID, a client secret, and a tenant ID for each of the source data center and the destination data center.

Figure 4:
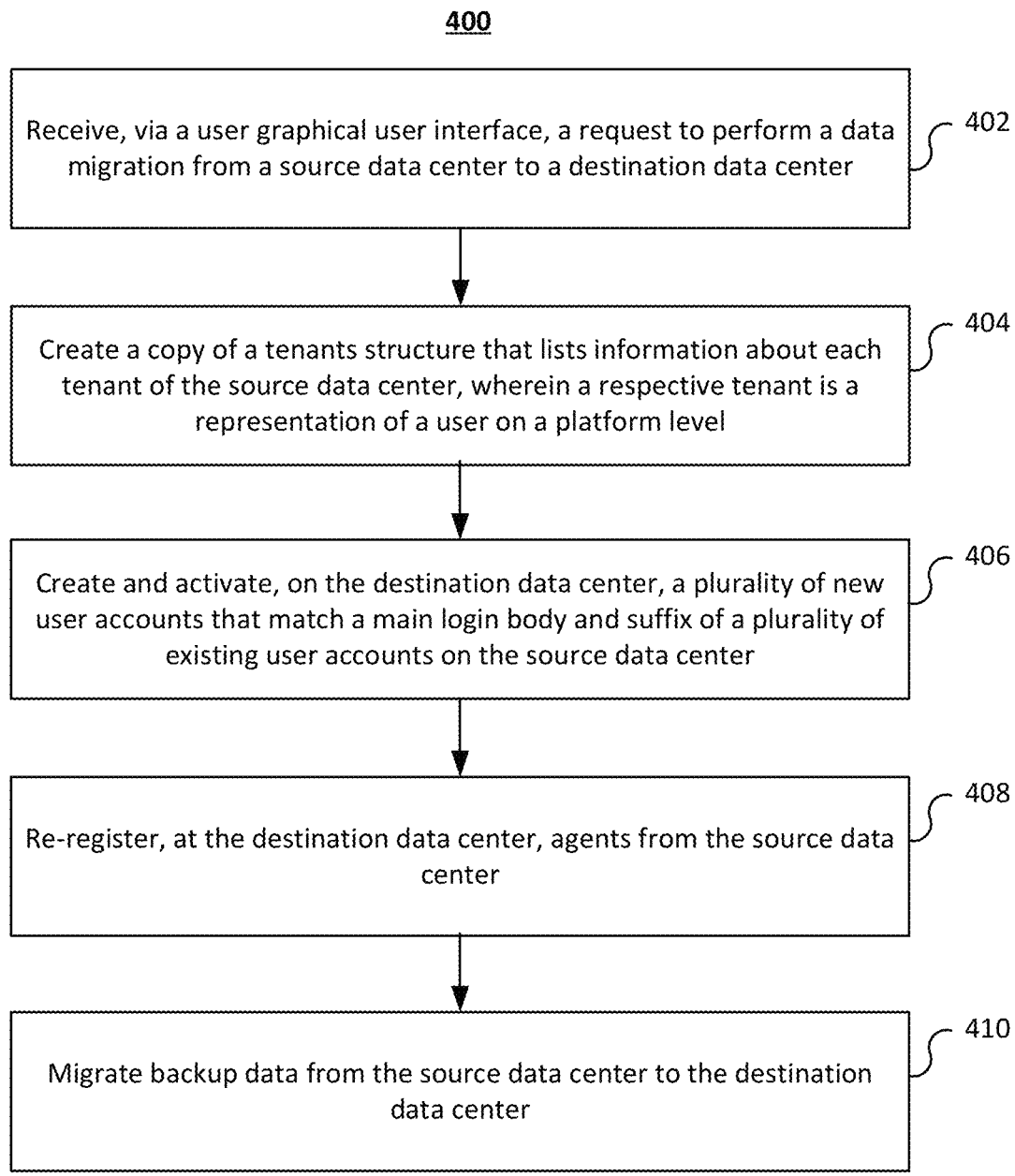
FIG. 4 is a flow diagram illustrating a method for performing a migration from a source data center to a destination data center.

FIG. 4 is a diagram illustrating a method 400 for performing a migration from a source data center to a destination data center. At 402, migration tool 102 receives, via a user graphical user interface, a request to perform a data migration from a source data center to a destination data center. In some aspects, the graphical user interface outputs a list of data centers available to receive migration data. Accordingly, receiving the request comprises receiving a selection of the destination data center from the list of data centers.

In response to receiving the request, migration tool 102 performs the data migration. In particular, at 404, migration tool 102 creates a copy of a tenants structure that lists information about each tenant of the source data center, wherein a respective tenant is a representation of a user on a platform level. In some aspects, each tenant in the tenants structure has different specifications including names, contacts, tenant types, quotas, available services, and available.

At 406, migration tool 102 creates and activates, on the destination data center, a plurality of new user accounts that match a main login body and suffix of a plurality of existing user accounts on the source data center. In some aspects, in response to determining that two matching user accounts cannot exist on both the source data center and the destination data center, migration tool 102 generates, on the destination data center, an intermediate login for each user account corresponding to the plurality of existing user accounts. The intermediate login comprises an original login concatenated with a predefined term. In response to determining that the data migration is complete, migration tool 102 deletes the plurality of existing user accounts on the source data center and modifies, for the plurality of new user accounts, each intermediate login to match the original login without the predefined term.

In some aspects, when creating the plurality of new user accounts, migration tool 102 sets parameters for services, applications, and quotas in the plurality of new user accounts that match parameters for services, applications, and quotas in the plurality of existing user accounts.

At 408, migration tool 102 re-registers, at the destination data center, agents from the source data center. In some aspects, migration tool 102 further transfers agent protection plans associated with the agents from the source data center to the destination data center.

At 410, migration tool 102 migrates backup data from the source data center to the destination data center.

In some aspects, migration tool 102 may implement a machine learning model 118 to perform the steps described above. For example, to implement the step of creating a copy of a tenant's structure that lists information about each tenant of the source data center using a machine learning model 118, the process begins with data extraction and transformation. The machine learning model 118 may be trained to recognize and extract relevant tenant information from the source data center. This involves identifying key attributes such as tenant IDs, user profiles, access permissions, and associated metadata. The model 118 may utilize natural language processing (NLP) techniques to parse through unstructured data and convert it into a structured format. Once the data is extracted, the model 118 applies transformation rules to ensure consistency and compatibility with the destination data center's schema. This step enables maintaining data integrity and ensuring that the tenant information is accurately represented in the new environment.

After the data is transformed, the machine learning model 118 may automate the creation of a tenant structure in the destination data center. This involves generating a hierarchical representation of the tenant information, including user accounts, roles, and permissions. The model 118 may use clustering algorithms to group similar tenants and optimize the structure for efficient data access and management. Additionally, the model 118 may incorporate validation checks to ensure that the newly created tenant structure adheres to predefined business rules and compliance requirements. By leveraging machine learning, the entire process of copying and structuring tenant information becomes more efficient, accurate, and scalable, reducing the risk of errors and minimizing downtime during the data migration process.

In some aspects, clustering algorithms, such as K-means, hierarchical clustering, or DBSCAN, may be used by the model 118 to optimize the structure of tenant data during a migration process. By analyzing various attributes of each tenant—such as usage patterns, data volume, and access frequency—the machine learning model 118 may group similar tenants together. This grouping allows for a more organized and efficient data structure in the destination data center. For instance, tenants with similar resource needs or access behaviors may be clustered, enabling the system to allocate resources more effectively and balance the load more efficiently. This not only improves data retrieval times but also enhances overall system performance by ensuring that resources are used optimally.

Moreover, clustering simplifies the management and maintenance of the data center. When tenants with similar characteristics are grouped together, administrative tasks such as updates, patches, and configuration changes may be applied to entire clusters rather than individual tenants. This reduces the administrative overhead and makes the system easier to manage. Additionally, monitoring and troubleshooting become more focused and efficient, as issues may be addressed at the cluster level. Clustering also provides scalability and flexibility, allowing the system to adapt to new tenants by integrating them into existing clusters or forming new ones based on their attributes. This dynamic approach ensures that the data center may grow and evolve without significant reorganization, maintaining efficiency and performance.

When considering the context of method 400, clustering can significantly optimize the data migration process by enhancing efficiency and organization across various steps. When creating a copy of a tenant's structure, clustering tenants based on similar attributes—such as usage patterns, data volume, and access frequency—allows for a more organized and streamlined data structure. This grouping makes it easier to manage and retrieve tenant information, ensuring data integrity and accurate representation in the new environment.

Additionally, clustering enables the system to apply consistent transformation rules across similar groups, reducing complexity and potential errors during data extraction and transformation. This organized approach also facilitates bulk processing when creating and activating new user accounts in the destination data center, as similar accounts may be handled together, speeding up the process and ensuring consistent setup.

Moreover, clustering optimizes the re-registration of agents and the migration of backup data by allowing for batch processing and efficient resource allocation. By grouping tenants with similar agent configurations or backup needs, the system may re-register agents and transfer backup data in batches, reducing administrative overhead and minimizing the risk of errors. This approach ensures that necessary configurations and settings are applied consistently across similar groups, enhancing the accuracy and security of the migration. Clustering also helps in balancing the load and preventing bottlenecks during data transfer, as resources such as bandwidth and storage may be allocated appropriately based on the needs of each cluster. Overall, clustering leads to a more streamlined, efficient, and error-free migration process, ensuring a smooth transition to the destination data center.

Figure 5:
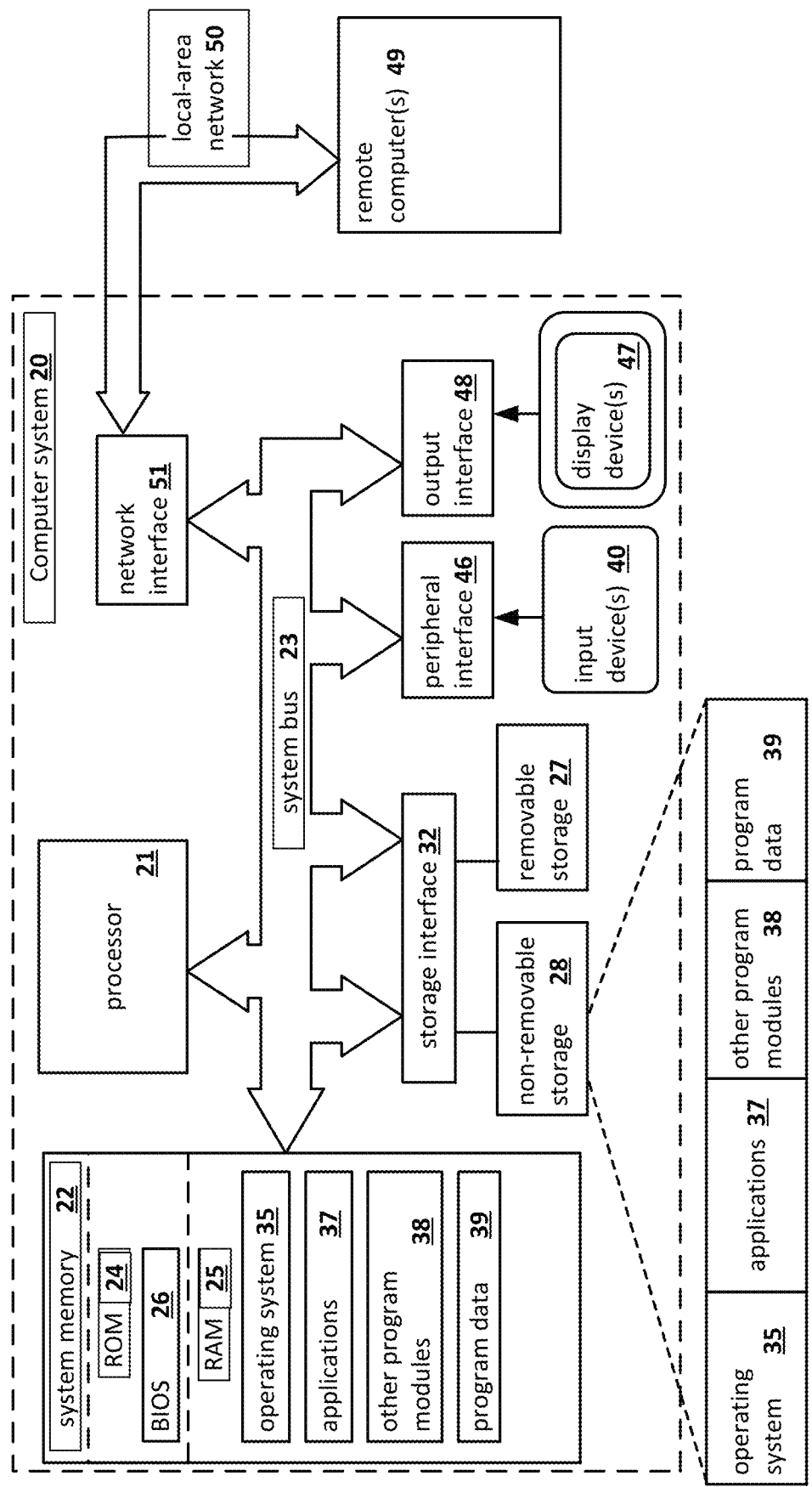
FIG. 5 presents an example of a general-purpose computer system on which aspects of the present disclosure can be implemented.

FIG. 5 is a block diagram illustrating a computer system 20 on which aspects of systems and methods for migration from a source data center to a destination data center may be implemented in accordance with an exemplary aspect. The computer system 20 can be in the form of multiple computing devices, or in the form of a single computing device, for example, a desktop computer, a notebook computer, a laptop computer, a mobile computing device, a smart phone, a tablet computer, a server, a mainframe, an embedded device, and other forms of computing devices.

As shown, the computer system 20 includes a central processing unit (CPU) 21, a system memory 22, and a system bus 23 connecting the various system components, including the memory associated with the central processing unit 21. The system bus 23 may comprise a bus memory or bus memory controller, a peripheral bus, and a local bus that is able to interact with any other bus architecture. Examples of the buses may include PCI, ISA, PCI-Express, Hyper-Transport™, InfiniBand™, Serial ATA, I²C, and other suitable interconnects. The central processing unit 21 (also referred to as a processor) can include a single or multiple sets of processors having single or multiple cores. The processor 21 may execute one or more computer-executable code implementing the techniques of the present disclosure. For example, any of commands/steps discussed in FIGS. 1-4 may be performed by processor 21. The system memory 22 may be any memory for storing data used herein and/or computer programs that are executable by the processor 21. The system memory 22 may include volatile memory such as a random access memory (RAM) 25 and non-volatile memory such as a read only memory (ROM) 24, flash memory, etc., or any combination thereof. The basic input/output system (BIOS) 26 may store the basic procedures for transfer of information between elements of the computer system 20, such as those at the time of loading the operating system with the use of the ROM 24.

The computer system 20 may include one or more storage devices such as one or more removable storage devices 27, one or more non-removable storage devices 28, or a combination thereof. The one or more removable storage devices 27 and non-removable storage devices 28 are connected to the system bus 23 via a storage interface 32. In an aspect, the storage devices and the corresponding computer-readable storage media are power-independent modules for the storage of computer instructions, data structures, program modules, and other data of the computer system 20. The system memory 22, removable storage devices 27, and non-removable storage devices 28 may use a variety of computer-readable storage media. Examples of computer-readable storage media include machine memory such as cache, SRAM, DRAM, zero capacitor RAM, twin transistor RAM, eDRAM, EDO RAM, DDR RAM, EEPROM, NRAM, RRAM, SONOS, PRAM; flash memory or other memory technology such as in solid state drives (SSDs) or flash drives; magnetic cassettes, magnetic tape, and magnetic disk storage such as in hard disk drives or floppy disks; optical storage such as in compact disks (CD-ROM) or digital versatile disks (DVDs); and any other medium which may be used to store the desired data and which can be accessed by the computer system 20.

The system memory 22, removable storage devices 27, and non-removable storage devices 28 of the computer system 20 may be used to store an operating system 35, additional program applications 37, other program modules 38, and program data 39. The computer system 20 may include a peripheral interface 46 for communicating data from input devices 40, such as a keyboard, mouse, stylus, game controller, voice input device, touch input device, or other peripheral devices, such as a printer or scanner via one or more I/O ports, such as a serial port, a parallel port, a universal serial bus (USB), or other peripheral interface. A display device 47 such as one or more monitors, projectors, or integrated display, may also be connected to the system bus 23 across an output interface 48, such as a video adapter. In addition to the display devices 47, the computer system 20 may be equipped with other peripheral output devices (not shown), such as loudspeakers and other audiovisual devices.

The computer system 20 may operate in a network environment, using a network connection to one or more remote computers 49. The remote computer (or computers) 49 may be local computer workstations or servers comprising most or all of the aforementioned elements in describing the nature of a computer system 20. Other devices may also be present in the computer network, such as, but not limited to, routers, network stations, peer devices or other network nodes. The computer system 20 may include one or more network interfaces 51 or network adapters for communicating with the remote computers 49 via one or more networks such as a local-area computer network (LAN) 50, a wide-area computer network (WAN), an intranet, and the Internet.

Examples of the network interface 51 may include an Ethernet interface, a Frame Relay interface, SONET interface, and wireless interfaces.

Aspects of the present disclosure may be a system, a method, and/or a computer program product. The computer program product may include a computer readable storage medium (or media) having computer readable program instructions thereon for causing a processor to carry out aspects of the present disclosure.

The computer readable storage medium can be a tangible device that can retain and store program code in the form of instructions or data structures that can be accessed by a processor of a computing device, such as the computing system 20. The computer readable storage medium may be an electronic storage device, a magnetic storage device, an optical storage device, an electromagnetic storage device, a semiconductor storage device, or any suitable combination thereof. By way of example, such computer-readable storage medium can comprise a random access memory (RAM), a read-only memory (ROM), EEPROM, a portable compact disc read-only memory (CD-ROM), a digital versatile disk (DVD), flash memory, a hard disk, a portable computer diskette, a memory stick, a floppy disk, or even a mechanically encoded device such as punch-cards or raised structures in a groove having instructions recorded thereon. As used herein, a computer readable storage medium is not to be construed as being transitory signals per se, such as radio waves or other freely propagating electromagnetic waves, electromagnetic waves propagating through a waveguide or transmission media, or electrical signals transmitted through a wire.

Computer readable program instructions described herein can be downloaded to respective computing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network interface in each computing device receives computer readable program instructions from the network and forwards the computer readable program instructions for storage in a computer readable storage medium within the respective computing device.

Computer readable program instructions for carrying out operations of the present disclosure may be assembly instructions, instruction-set-architecture (ISA) instructions, machine instructions, machine dependent instructions, microcode, firmware instructions, state-setting data, or either source code or object code written in any combination of one or more programming languages, including an object oriented programming language, and conventional procedural programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a LAN or WAN, or the connection may be made to an external computer (for example, through the Internet). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present disclosure.

In various aspects, the systems and methods described in the present disclosure can be addressed in terms of modules. The term "module" as used herein refers to a real-world device, component, or arrangement of components implemented using hardware, such as by an application specific integrated circuit (ASIC) or FPGA, for example, or as a combination of hardware and software, such as by a microprocessor system and a set of instructions to implement the module's functionality, which (while being executed) transform the microprocessor system into a special-purpose device. A module may also be implemented as a combination of the two, with certain functions facilitated by hardware alone, and other functions facilitated by a combination of hardware and software. In certain implementations, at least a portion, and in some cases, all, of a module may be executed on the processor of a computer system. Accordingly, each module may be realized in a variety of suitable configurations, and should not be limited to any particular implementation exemplified herein.

In the interest of clarity, not all of the routine features of the aspects are disclosed herein. It would be appreciated that in the development of any actual implementation of the present disclosure, numerous implementation-specific decisions must be made in order to achieve the developer's specific goals, and these specific goals will vary for different implementations and different developers. It is understood that such a development effort might be complex and time-consuming, but would nevertheless be a routine undertaking of engineering for those of ordinary skill in the art, having the benefit of this disclosure.

Furthermore, it is to be understood that the phraseology or terminology used herein is for the purpose of description and not of restriction, such that the terminology or phraseology of the present specification is to be interpreted by the skilled in the art in light of the teachings and guidance presented herein, in combination with the knowledge of those skilled in the relevant art(s). Moreover, it is not intended for any term in the specification or claims to be ascribed an uncommon or special meaning unless explicitly set forth as such.

The various aspects disclosed herein encompass present and future known equivalents to the known modules referred to herein by way of illustration. Moreover, while aspects and applications have been shown and described, it would be apparent to those skilled in the art having the benefit of this disclosure that many more modifications than mentioned above are possible without departing from the inventive concepts disclosed herein.

The invention claimed is:

1. A method for data migration, the method comprising:
 receiving, via a user graphical user interface, a request to perform a data migration from a source data center to a destination data center; and
 in response to receiving the request, performing the data migration by:
  creating a copy of a tenants structure that lists information about each tenant of the source data center, wherein a respective tenant is a representation of a user on a platform level;
  creating and activating, on the destination data center, a plurality of new user accounts that match a main login body and suffix of a plurality of existing user accounts on the source data center;
  re-registering, at the destination data center, agents from the source data center; and migrating backup data from the source data center to the destination data center.

2. The method of claim 1, wherein creating the plurality of new user accounts further comprises:
in response to determining that two matching user accounts cannot exist on both the source data center and the destination data center, generating, on the destination data center, an intermediate login for each user account corresponding to the plurality of existing user accounts, wherein the intermediate login comprises an original login concatenated with a predefined term; and
in response to determining that the data migration is complete:
deleting the plurality of existing user accounts on the source data center; and
modifying, for the plurality of new user accounts, each intermediate login to match the original login without the predefined term.

3. The method of claim 1, wherein each tenant in the tenants structure has different specifications including names, contacts, tenant types, quotas, available services, and available storage.

4. The method of claim 1, wherein the graphical user interface outputs a list of data centers available to receive migration data and wherein receiving the request comprises receiving a selection of the destination data center from the list of data centers.

5. The method of claim 1, further comprising:
transferring agent protection plans associated with the agents from the source data center to the destination data center.

6. The method of claim 1, wherein creating the plurality of new user accounts further comprises setting parameters for services, applications, and quotas in the plurality of new user accounts that match parameters for services, applications, and quotas in the plurality of existing user accounts.

7. A system for data migration, the system comprising:
At least one memory; and
At least one hardware processor coupled with the at least one memory and configured, individually or in combination, to:
receive, via a user graphical user interface, a request to perform a data migration from a source data center to a destination data center; and
in response to receiving the request, perform the data migration by:
creating a copy of a tenants structure that lists information about each tenant of the source data center, wherein a respective tenant is a representation of a user on a platform level;
creating and activating, on the destination data center, a plurality of new user accounts that match a main login body and suffix of a plurality of existing user accounts on the source data center;
re-registering, at the destination data center, agents from the source data center; and
migrating backup data from the source data center to the destination data center.

8. The system of claim 7, wherein the at least one hardware processor is further configured to create the plurality of new user accounts by:
in response to determining that two matching user accounts cannot exist on both the source data center and the destination data center, generating, on the destination data center, an intermediate login for each user account corresponding to the plurality of existing user accounts, wherein the intermediate login comprises an original login concatenated with a predefined term; and
in response to determining that the data migration is complete:
deleting the plurality of existing user accounts on the source data center; and
modifying, for the plurality of new user accounts, each intermediate login to match the original login without the predefined term.

9. The system of claim 7, wherein each tenant in the tenants structure has different specifications including names, contacts, tenant types, quotas, available services, and available storage.

10. The system of claim 7, wherein the graphical user interface outputs a list of data centers available to receive migration data and wherein receiving the request comprises receiving a selection of the destination data center from the list of data centers.

11. The system of claim 7, wherein the at least one hardware processor is further configured to:
transfer agent protection plans associated with the agents from the source data center to the destination data center.

12. The system of claim 7, wherein the at least one hardware processor is further configured to create the plurality of new user accounts by setting parameters for services, applications, and quotas in the plurality of new user accounts that match parameters for services, applications, and quotas in the plurality of existing user accounts.

13. A non-transitory computer readable medium storing thereon computer executable instructions for data migration, including instructions for:
receiving, via a user graphical user interface, a request to perform a data migration from a source data center to a destination data center; and
in response to receiving the request, performing the data migration by:
creating a copy of a tenants structure that lists information about each tenant of the source data center, wherein a respective tenant is a representation of a user on a platform level;
creating and activating, on the destination data center, a plurality of new user accounts that match a main login body and suffix of a plurality of existing user accounts on the source data center;
re-registering, at the destination data center, agents from the source data center; and
migrating backup data from the source data center to the destination data center.

14. The non-transitory computer readable medium of claim 13, wherein instructions for creating the plurality of new user accounts further comprise instructions for:
in response to determining that two matching user accounts cannot exist on both the source data center and the destination data center, generating, on the destination data center, an intermediate login for each user account corresponding to the plurality of existing user accounts, wherein the intermediate login comprises an original login concatenated with a predefined term; and
in response to determining that the data migration is complete:
deleting the plurality of existing user accounts on the source data center; and modifying, for the plurality of new user accounts, each intermediate login to match the original login without the predefined term.

15. The non-transitory computer readable medium of claim 13, wherein each tenant in the tenants structure has different specifications including names, contacts, tenant types, quotas, available services, and available storage.

16. The non-transitory computer readable medium of claim 13, wherein the graphical user interface outputs a list of data centers available to receive migration data and wherein receiving the request comprises receiving a selection of the destination data center from the list of data centers.

17. The non-transitory computer readable medium of claim 13, further comprising instructions for:
transferring agent protection plans associated with the agents from the source data center to the destination data center.

18. The non-transitory computer readable medium of claim 13, instructions for creating the plurality of new user accounts further comprise instructions for setting parameters for services, applications, and quotas in the plurality of new user accounts that match parameters for services, applications, and quotas in the plurality of existing user accounts.

* * * * *